United States Patent
Peterson

(10) Patent No.: US 9,002,994 B2
(45) Date of Patent: Apr. 7, 2015

(54) SYSTEM AND METHOD FOR CONNECTION EFFICIENCY

(75) Inventor: Robert W. Peterson, Plano, TX (US)

(73) Assignee: Open Invention Network, LLC, Durham, NC (US)

( * ) Notice: Subject to any disclaimer, the term of this patent is extended or adjusted under 35 U.S.C. 154(b) by 895 days.

(21) Appl. No.: 13/078,950

(22) Filed: Apr. 2, 2011

(65) Prior Publication Data

US 2012/0254375 A1 Oct. 4, 2012

(51) Int. Cl.
*G06F 15/177* (2006.01)
*G06F 15/16* (2006.01)
*H04L 29/08* (2006.01)

(52) U.S. Cl.
CPC ....................................... *H04L 67/02* (2013.01)

(58) Field of Classification Search
CPC ........ H04L 67/16; H04L 69/329; H04L 29/06
See application file for complete search history.

(56) References Cited

U.S. PATENT DOCUMENTS

| 5,553,242 | A | * | 9/1996 | Russell et al. | 709/203 |
| 6,101,528 | A | * | 8/2000 | Butt | 709/203 |
| 2002/0038371 | A1 | * | 3/2002 | Spacey | 709/227 |
| 2002/0147771 | A1 | * | 10/2002 | Traversat et al. | 709/203 |
| 2003/0065756 | A1 | * | 4/2003 | Carrez | 709/203 |
| 2006/0253558 | A1 | * | 11/2006 | Acree et al. | 709/220 |
| 2011/0055374 | A1 | * | 3/2011 | Christenson et al. | 709/224 |
| 2011/0282934 | A1 | * | 11/2011 | Chalana et al. | 709/203 |

* cited by examiner

*Primary Examiner* — Peling Shaw
(74) *Attorney, Agent, or Firm* — Haynes and Boone, LLP

(57) ABSTRACT

In a distributed object computing system, a server application may create multiple, uniquely identified, server contexts that each provide one or more services to a service consumer (client). Instead of creating a connection to a client for each server context, a single connection can be used. A service request handler may be configured to handle service requests for each server context. Service requests may be generated in the client with a service context identity. When a service request is received by the server application, the service request handler resolves the service context identity and forwards the service request to the appropriate server context.

20 Claims, 5 Drawing Sheets

Diagram 2 : After Initialization

Diagram 4: Two Consumers and Services

SYSTEM AND METHOD FOR CONNECTION EFFICIENCY

FIELD OF THE INVENTION

This disclosure relates primarily, though not exclusively, to distributed object computing and to systems and methods for communicating between server and client applications.

BACKGROUND OF THE INVENTION

The present Applicants and Assignees have developed a distributed object platform known proprietarily as Voyager. The following specification makes specific reference to Voyager. However, the examples and references described are not intended to be limited to the specific Voyager platform and nor its specific features and capabilities. The methods and examples to be described will have application to other platforms, and in particular to other distributed object systems.

A distributed application, such as Voyager and other distributed object/ORB systems, may, in some situations, create multiple connections between the same pair of application instances. These unshared connections unnecessarily consume network, memory, and processor resources. In particular, establishing a connection between application instances over a network requires significant time, time that is considered nonproductive overhead. For TCP connections the maximum time allowed for creating a physical connection is commonly set to 1 second or longer. Exchanging initial information, i.e., handshaking over a new connection to establish a higher level logical connection, e.g., to encrypt the connection or to verify the identity of each end of the connection, adds to the overhead.

One common solution to this problem is to pool (cache) connections at the physical level. When an application wishes to connect to a remote machine, it first checks the pool for an existing connection. If it finds one it uses that connection. The identity of the remote machine, used to search the pool, is the network address of the remote machine. However, using the network address as the identity of a computer fails to account for a state change at the remote computer, e.g., a restart of the application. Using the network address as the only identifier may also enable "man in the middle" attacks.

What is required is an improved system and method for providing connections between client and server applications.

SUMMARY OF THE INVENTION

In a distributed object computing system, a server application may create multiple, uniquely identified, server contexts that each provide one or more services to a service consumer (client). Instead of creating a connection to a client for each server context, a single connection can be used. A service request handler may be configured to handle service requests for each server context. Service requests may be generated in the client with a service context identity. When a service request is received by the server application, the service request handler resolves the service context identity and forwards the service request to the appropriate server context.

In one aspect of the disclosure, there is provided a method for providing services from a service provider to a service consumer. A plurality of server contexts may be configured at a device. Each server context may comprise a unique server context identity and one or more indexed services. Each server context may be configured to provide an indexed service in response to a service request. A service request handler may handle service requests for the plurality of server contexts. The service request handler may resolve a server context identity of the service request and forward the service request to the resolved server context. The server context may retrieve an indexed service in the server context and generate a service response in the server context, the service response comprising the result of an invocation of the retrieved indexed service.

In one aspect of the disclosure, there is provided a method for sharing a connection from a client application on a client device to a server application on a server device comprising a plurality of server contexts. An endpoint may be configured in the client application comprising a connection to the server application. A plurality of client contexts may be configured in the client application, each client context comprising a reference to one of the plurality of server contexts. A service request may be generated that comprises a service request ID, a namespace ID that identifies one of the plurality of server contexts, and a service index that identifies a service within the identified server context. The service request may be provided from the client application to the service application on the connection.

In one aspect of the disclosure, there is provided a system comprising a server device executing a server application configured to create a plurality of server contexts at a network address of the server device and at least one client device executing a client application. Each server context comprises a server context identity (referred to as a namespace ID) independent of the network address and one or more referenced services. The client application may be configured to create a plurality of client contexts as proxies for the one or more referenced services of a respective server context and generate a service request for the one or more referenced services, the service request comprising a server context identity. At least one of the client application and the server application may be configured to create a network connection between the client application and the server application such that a plurality of service requests to a plurality of the server contexts are able to be provided over the same connection.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
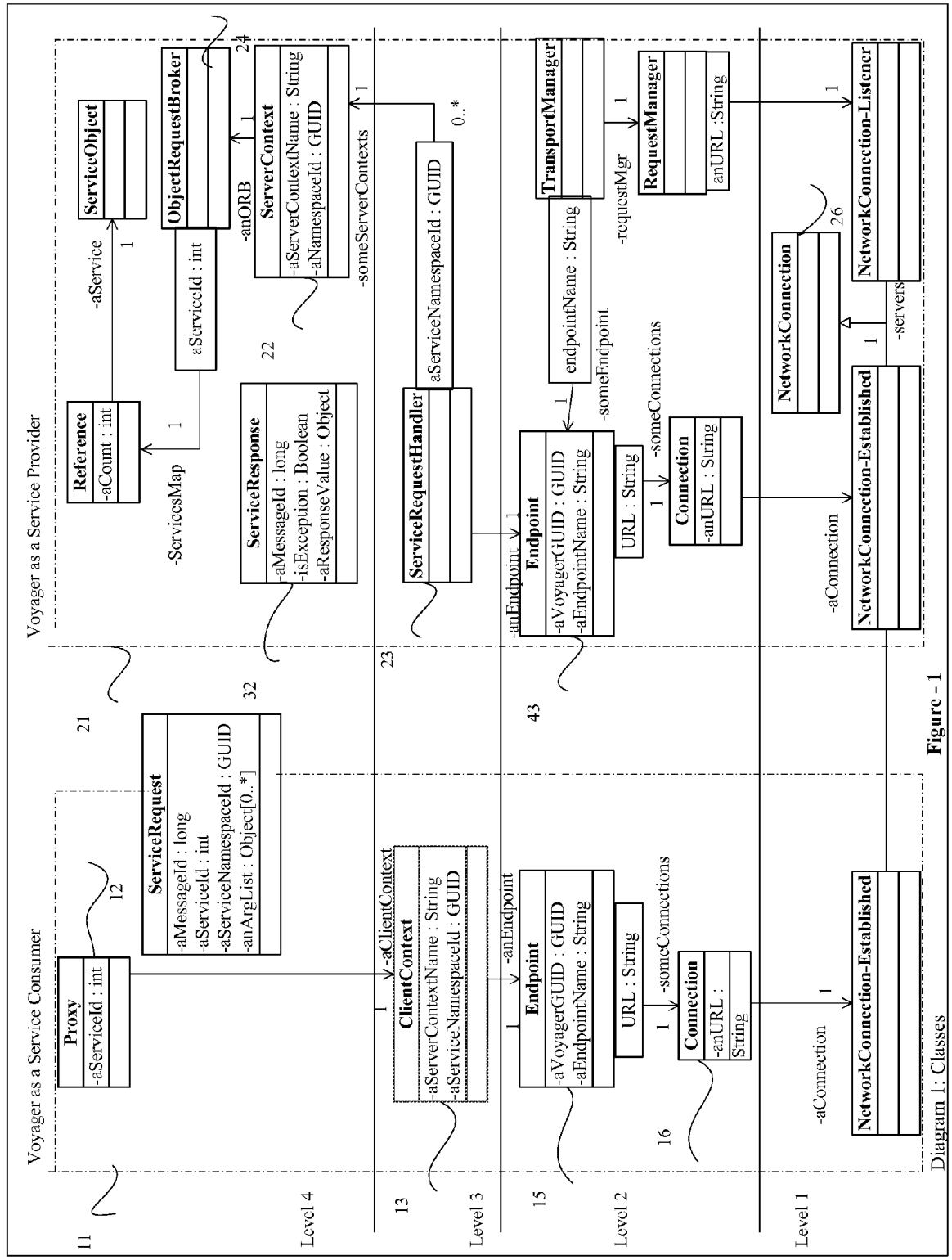
FIG. 1 shows a distributed object computing platform with a client instance and a server instance.

The description and understanding of the present embodiments will be facilitated by a brief summary of the Voyager platform, made with reference to FIG. 1, some aspects of which may relate to similar distributed object computing systems. A person skilled in the art will readily understand that not all aspects of the Voyager platform are necessary for performing the present embodiments.

In FIG. 1, there is shown an instance of a distributed object application operating as a service provider on a server device. The server device may be a computing system comprising at least one processor and at least one operatively associated memory. The memory may store executable instructions for executing the server application. FIG. 1 also shows an instance of a distributed object application operating as a service consumer or client on a client device. The client device may be a computing system comprising at least one processor and at least one operatively associated memory. The memory may store executable instructions for executing the client application. While only a single server instance and a single client instance is shown, the network may include multiple servers and multiple clients.

A network connection may be defined as a Level 1 connection. Level 1 connections are typically created and managed using services provided by an operating system and/or programming language. A TCP connection over an Ethernet LAN is an example of a Level 1 connection.

An "Endpoint" may be defined as a Level 2 connection. An Endpoint is one end of a Level 1 connection between two independent copies of Voyager. An Endpoint can be created by a server that accepts connection requests or by a client when a connection is required. An Endpoint typically manages one end of a network connection, e.g., a TCP socket. An Endpoint's identity is the identity of the application instance (Voyager instance) containing it. An Endpoint also contains zero or more network addresses, used to identify the Level 1 network connections it contains or could contain, and zero or more Level 1 connections, each identified by a network address. FIG. 1 shows a client side endpoint 15 and a server side endpoint 43.

When two Endpoints connect using a Level 1 connection they exchange a handshake packet that contains at least the identity of each Endpoint.

The connection between a service consumer and a collection of services offered by a service provider may be defined as a Level 3 connection.

A ServiceRequestHandler 23 may be defined as the Endpoint container at the service provider end of a Level 3 connection. A ServiceRequestHandler 23 routes a ServiceRequest to a ServerContext 22.

A ClientContext 13 may be defined as the service consumer at one end of a Level 3 connection. A ClientContext 13 typically references one Endpoint 15. A ClientContext's identity is the same as the identity of the ServerContext 22 at the other end of the logical connection.

Establishing a Level 3 connection involves associating a ClientContext 13 and a ServerContext 22 with a Level 2 connection. To establish the ClientContext end, an application provides the ClientContext 13 with an appropriate Endpoint 15. The ClientContext 13 then sends a request for a Level 3 connection over the Level 1 connection managed by the provided Endpoint 15. The request includes at least the identity of the ServerContext whose services the ClientContext requires. The Voyager that receives the request for a Level 3 connection identifies the ServerContext and asks the ServerContext to establish the Level 3 connection.

The connection between a single identified service provider and a single service consumer may be defined as a Level 4 connection. In Voyager terms, a service provider is an exported object, and a service consumer is the API of a service provider realized by the service provider's proxy.

A ServerContext 22 may be defined as the service provider manager at the service end of a Level 4 connection. A ServerContext 22 has a unique identity and is not directly associated with an Endpoint 43.

The lifetime of a Level 1 connection, which is managed by the containing Endpoint, may be the same as or shorter than the lifetime of an Endpoint.

The lifetime of an Endpoint, a Level 2 connection, is managed by the application.

The lifetime of a Level 3 connection, i.e., a ClientContext or a ServerContext, is managed by the application, and may be the same as or shorter than the lifetime of an Endpoint.

A Level 1 connection may be shared by zero or more Level 2 connections.

A Level 2 connection may be shared by zero or more Level 3 connections.

A Level 3 connection may be shared by zero or more Level 4 connections.

A ClientContext references a single ServiceRequestHandler.

A ServerContext may be referenced by zero or more ServiceRequestHandlers.

With the foregoing described as a basis of a distributed object computing system, the present embodiments will now be described with reference to the Figures.

In FIG. 1, there is shown a system 10 that includes an application 11 operating as a client or Service Consumer and a second application 21 operating as a server or Service Provider. The applications on the Provider and Consumer side might be different or the same. That is, the application 11 and application 21 may be first and second instances of the same application or may be distinct Service Consumer and Service Provider applications. In the example depicted, the first and second instances are indicated as instances of the Applicant's proprietary Voyager application. However, this is but one example only and other examples of client and server applications will be apparent to a person skilled in the art.

FIG. 1 also shows the relationships among the items. In FIG. 1, an open diamond arrowhead, e.g. NetworkConnection 26, shows inheritance (i.e. an "is a" relationship) while an open arrowhead, e.g. on the line between Proxy 12 and ClientContext 13, shows a reference. A box at one end of a reference indicates that the line represents a collection with the item in the box as the key used to find a specific instance within the collection.

As outlined above, services may be invoked on client applications through a proxy 12 that invokes a service from a service provider 21. The service may be invoked via a service request from the proxy to a ServerContext 22 that stores the service.

In accordance with an embodiment of the present disclosure, efficient service may be facilitated by establishing a namespace identity that uniquely identifies a service provider, such as a ServerContext 22. The ServerContext 22 provides a service index of services available from the ServerContext. That is, a service may be identified by the combination of a service index and the namespace within which the index can be resolved.

A service request may contain a single request for service, including the service request's id, the service namespace's globally unique identifier (GUID), a service index and any arguments needed to invoke the service. An example service request 31 is shown in FIG. 1. A service response may contain the service request id (used to associate the response with the request when the ServiceResponse arrives at the Service Consumer), a flag that is true if the service failed, and the value the service returned. If the flag is true, the value will be a report of the failure; otherwise the value is the result of a successful service invocation. An example of a service response 32 is shown in FIG. 1.

The system uses the (service index, service namespace GUID) tuple to identify the specific service when the service request passes from the service requestor to the service provider over a connection shared by multiple service requestors and multiple service provider namespaces. This arrangement allows multiple ClientContexts to use the same endpoint and same Level 1 connection to access different ServerContexts of a server application. At the server side, multiple ServerContexts are able to share a common ServiceRequestHandler 23 and endpoint 43. The common ServiceRequestHandler contains the mapping of a service namespace GUID (where the service namespace is managed by a ServerContext) to the realization of the namespace (a specific ServerContext 22).

Figure 2:
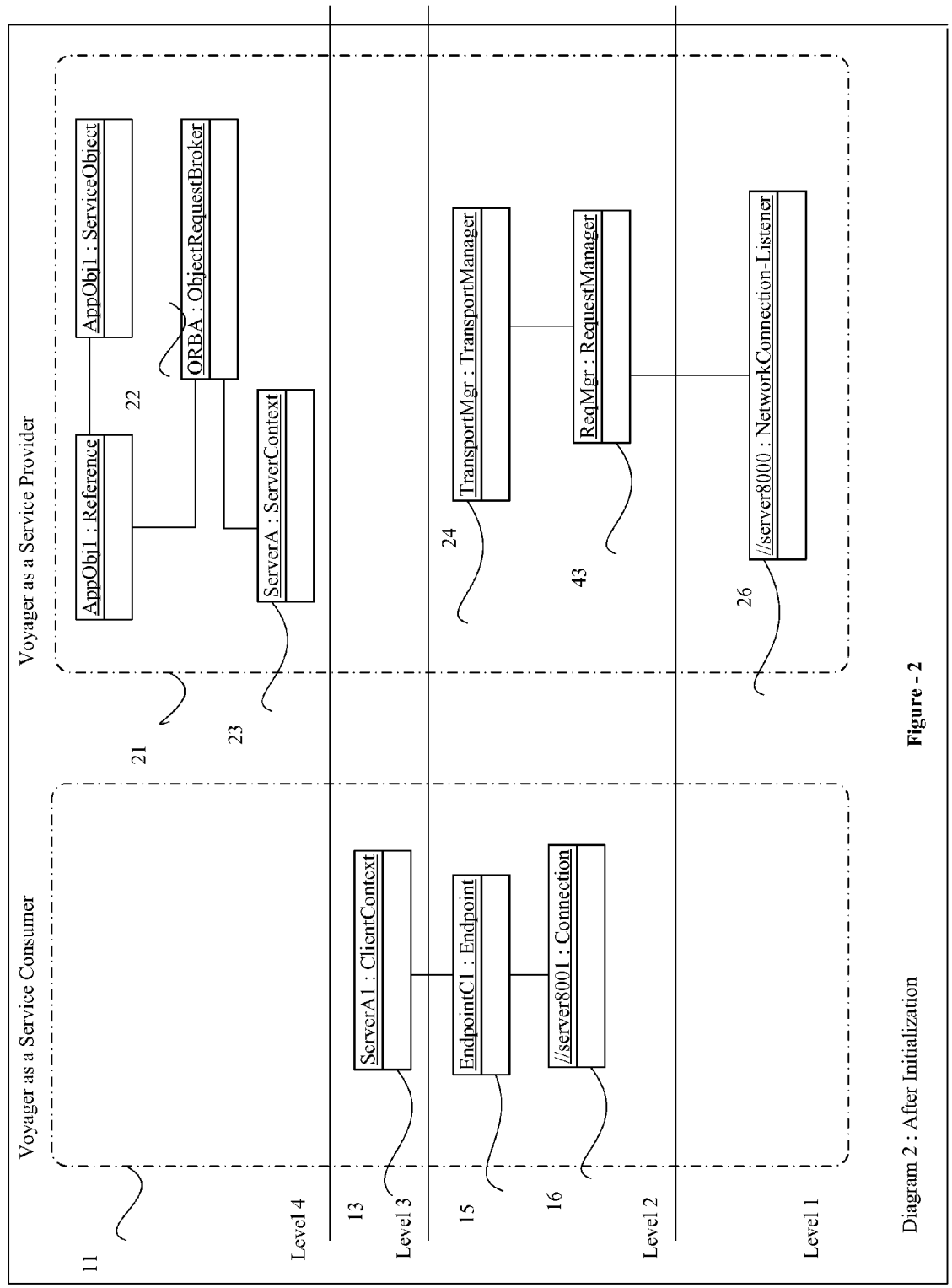
FIG. 2 shows the distributed object computing platform at a state of being ready to process service requests.

FIG. 2 shows the system 10 at a time when the Service Provider 21 is ready to process requests for services and the Service Consumer 11 is ready to begin issuing requests for services. FIG. 2 is an instance diagram, i.e., this diagram shows object instances created using the types shown in FIG. 1. Each instance has a name, separated from the instance type by a colon. For example, "ServerA1:ClientContext" means the instance is a ClientContext named ServerA1. Inside ServerA1 there is "anEndpoint=EndpointC1", meaning the attribute (aka variable) named anEndpoint has the value EndpointC1. In this case the value is a reference to the Endpoint identified as EndpointC1, not the literal string "EndpointC1".

In FIG. 2, the Service Provider's 21 startup processing has created a ServerContext 22, given it a name and created a unique identifier (aNamespaceId). In one embodiment, the name may be human-oriented printable name. The ServerContext 22 creates an ObjectRequestBroker 36 and exports an Application Object, ApplObj1 27. While a single application object 27 is shown, a single server context may provide any number of application objects as required. The application objects may be identified by a service index in the Object Request Broker 36. The server application asks the Transport Manager TransportMgr 28, created during startup of the server instance, to create ReqMgr, the RequestManager singleton 29. The RequestManager 29 creates the "//server8000" instance of NetworkConnection-Listener 35, which listens for client connection requests on a single network address.

In order to reference the exported Application Object offered by service provider 21, the Service Consumer 11 creates a Client Context 13 called "ServerA" which creates "EndpointC1" 15 to the ServerA Client Context 13. ClientContext 13 provides EndpointC1 15 an URL at which time the Endpoint 15 creates a "//server8000" Connection 16 passing in the network address that the new Connection will use when creating an instance of NetworkConnection-Established. EndpointC1 15 has not yet established a connection to a service provider, so the ClientContext 13 doesn't yet know the Server Context's namespace ID.

Figure 3:
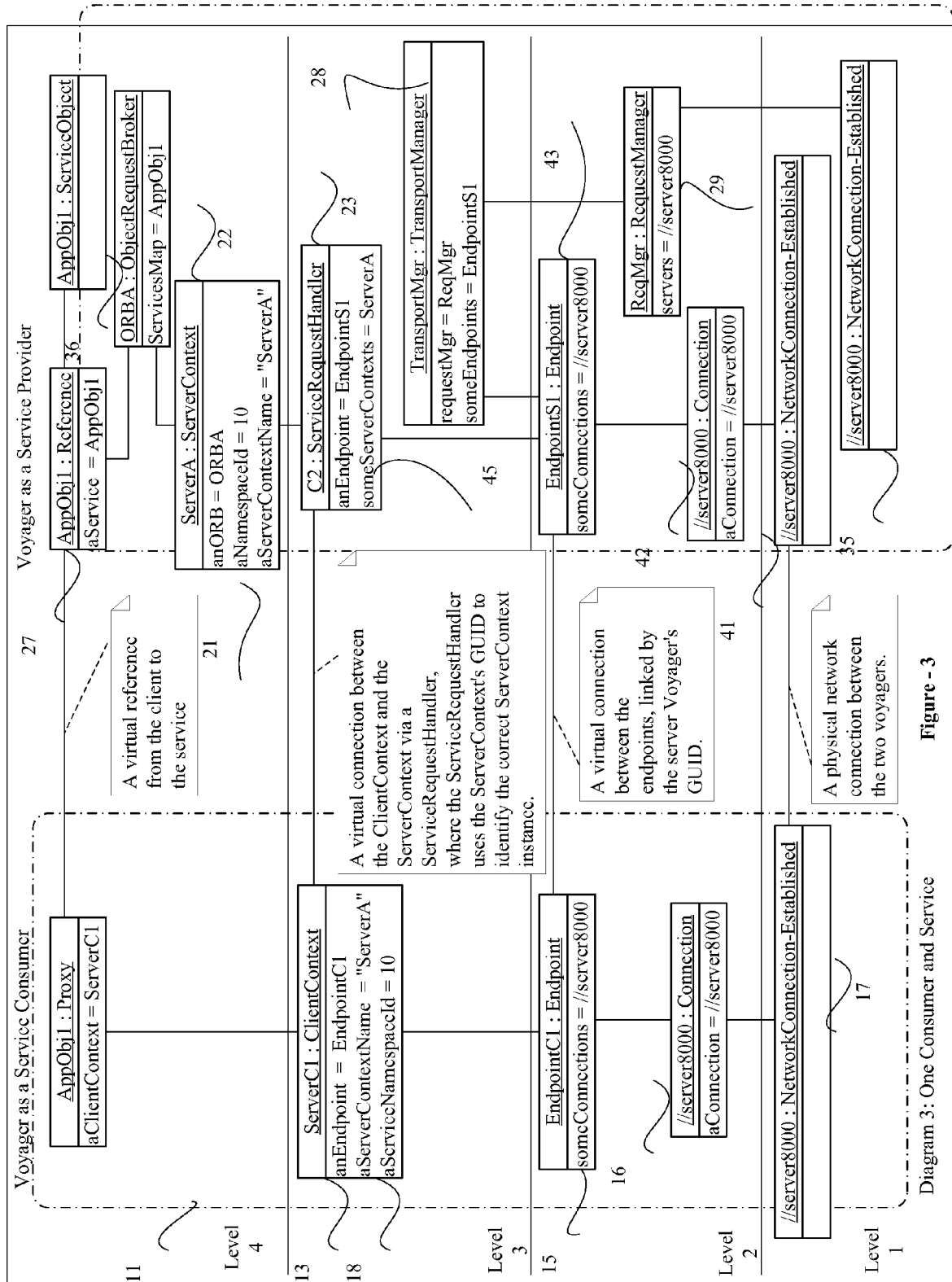
FIG. 3 shows the distributed object computing platform with a single client context and a single server context.

FIG. 3 shows the client and server instances after the application program has referenced a service provider at least one time. The client 11 has created an Endpoint 15 identified as EndpointC1, created a ClientContext 13 and told the ClientContext 13 to use EndpointC1 15, and created a Proxy "AppObj1" 12. At some point EndpointC1 established the connection 16 named "//server8000", which initially connected to the NetworkConnection-Listener 35. The RequestManager 29 processed the initial connection and created the "//server8000" instance of NetworkConnection-Established 41, the Connection 42 containing the new connection, the Endpoint 43 containing the Connection and the ServiceRequestHandler 23. The ServiceRequestHandler 23 includes a reference 45 mapping each ServerContext namespace Id that the server instance 21 is able to handle service requests for to the corresponding ServerContext. In this example, the ServiceRequestHandler references only the "ServerA" ServerContext 22, identified by namespace Id "10".

The client application obtains AppObj1 12, the Proxy that references the desired service instance, which causes AppObj1 12 to reference the ClientContext 13 identified as ServerC1. Note that ServerC1 contains the same service namespace id as the ServerContext 22 identified on the Service Provider side as ServerA. In one embodiment, obtaining a proxy typically happens when a client application asks Voyager's directory service to look up a service provider's name, or when a server application asks Voyager to create a service on a remote Voyager. While only a single Proxy 12 is shown, multiple proxies for multiple services may reference the same ClientContext 13.

The creation of NetworkConnection—Established happens when the connection is needed, for example, when AppObj1 12 actually sends a ServiceRequest to Service Provider 21. For the present purposes, it can be said that NetworkConnection—Established is created as part of obtaining the Proxy.

At this stage, the client application 11 can now use the AppObj1 proxy 12 to request invocation of a service. This causes the Proxy to build a ServiceRequest. A process for performing the service request is depicted in the flowchart 100 of FIG. 4. At step 101, the proxy AppObj1 12 hands the ServiceRequest with a request identifier to the ClientContext 13 identified as ServerC1. ServerC1 13 updates the ServiceRequest with a client context identifier (a namespace Id) (step 102), and hands the request to Endpoint EndpointC1 15 (step 103). EndpointC1 15 chooses Connection //server8000 16 to handle the request (step 104), and passes the ServiceRequest to //server8000 16 (step 105), which passes the ServiceRequest to NetworkConnection—Established 17 (step 106).

At step 107, NetworkConnection—Established 17 transfers the ServiceRequest over the connection to the Service Provider instance 21.

When the Service Consumer 11 creates its NetworkConnection—Established 17, the operating system establishes a connection to the listening entity 35 on the Service Provider 21 side of the connection. At the time of the connection, NetworkConnection—Listener 35 creates a NetworkConnection—Established 41. The NetworkConnection—Listener 35 then creates Endpoint EndpointS1 43, passing in the new NetworkConnection—Established 41. EndpointS1 43 then creates Connection //server8000 42 and passes in the NetworkConnection—Established 41.

The handshake between the Service Consumer's EndpointC1 15 and the Service Provider's EndpointS1 43 happens at this point. During the handshake the ServiceConsumer's EndpointC1 15 will either set the namespace id 18 of the ServerContext 22 in the ClientContext ServerC1 13, or if the value is already there, verify that the existing value matches the namespace id value the handshake provided.

Figure 4:
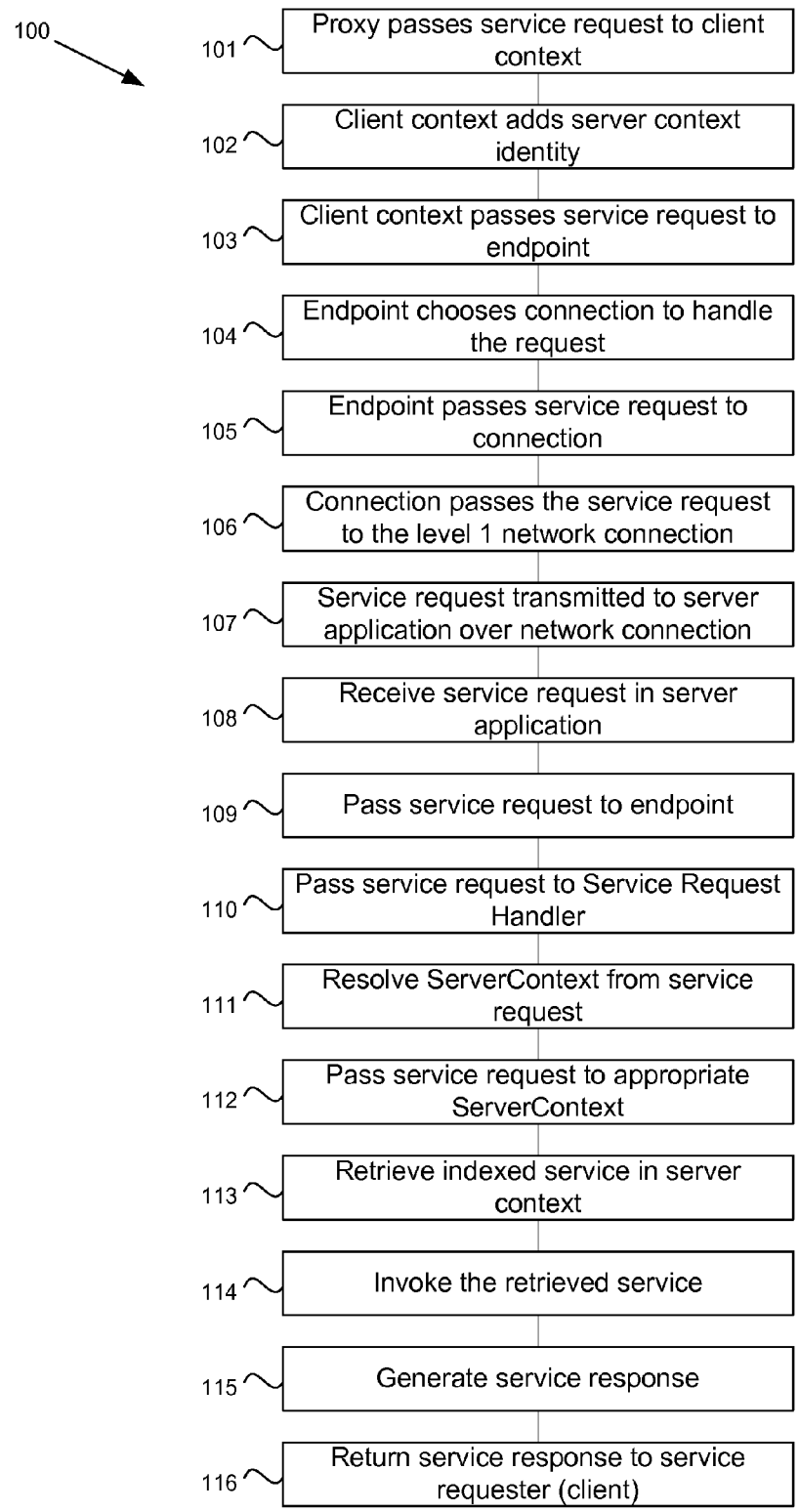
FIG. 4 shows a method for providing a service request.

Continuing the process 100 of FIG. 4, the NetworkConnection—Established identified as //server8000 41 now receives the ServiceRequest and passes it to the //server8000 Connection 42 (step 108). The //server8000 Connection 42 passes the ServiceRequest to the Endpoint EndpointS1 43 (step 109), which passes the ServiceRequest to C2, the singleton ServiceRequestHandler 23 (step 110).

The ServiceRequestHandler 23 resolves the correct ServerContext for the ServiceRequest (step 111) by retrieving the namespace id (10 in this example) from the ServiceRequest and using the namespace id to identify the correct ServerContext 22. The ServiceRequestHandler 23 then passes the Service Request to, in this case, the ServerContext ServerA (step 112).

ServerA 22 retrieves the service id from the ServiceRequest and uses it to retrieve the service instance reference AppObj1 from the ObjectRequestBroker 36 (step 113). ServerA 22 retrieves the service arguments from the ServiceRequest and invokes the service (step 114). ServerA 22 then uses the result of the invocation to create a ServerResponse object (step 115). ServerA 22 returns the ServerResponse to the Service Consumer application 11 (step 116) using essentially the same path as the ServiceRequest (not shown in the diagram), i.e., a ClientContext to an Endpoint to a Connection to a NetworkConnection—Established, over the physical network, and back to the requesting Proxy.

Figure 5:
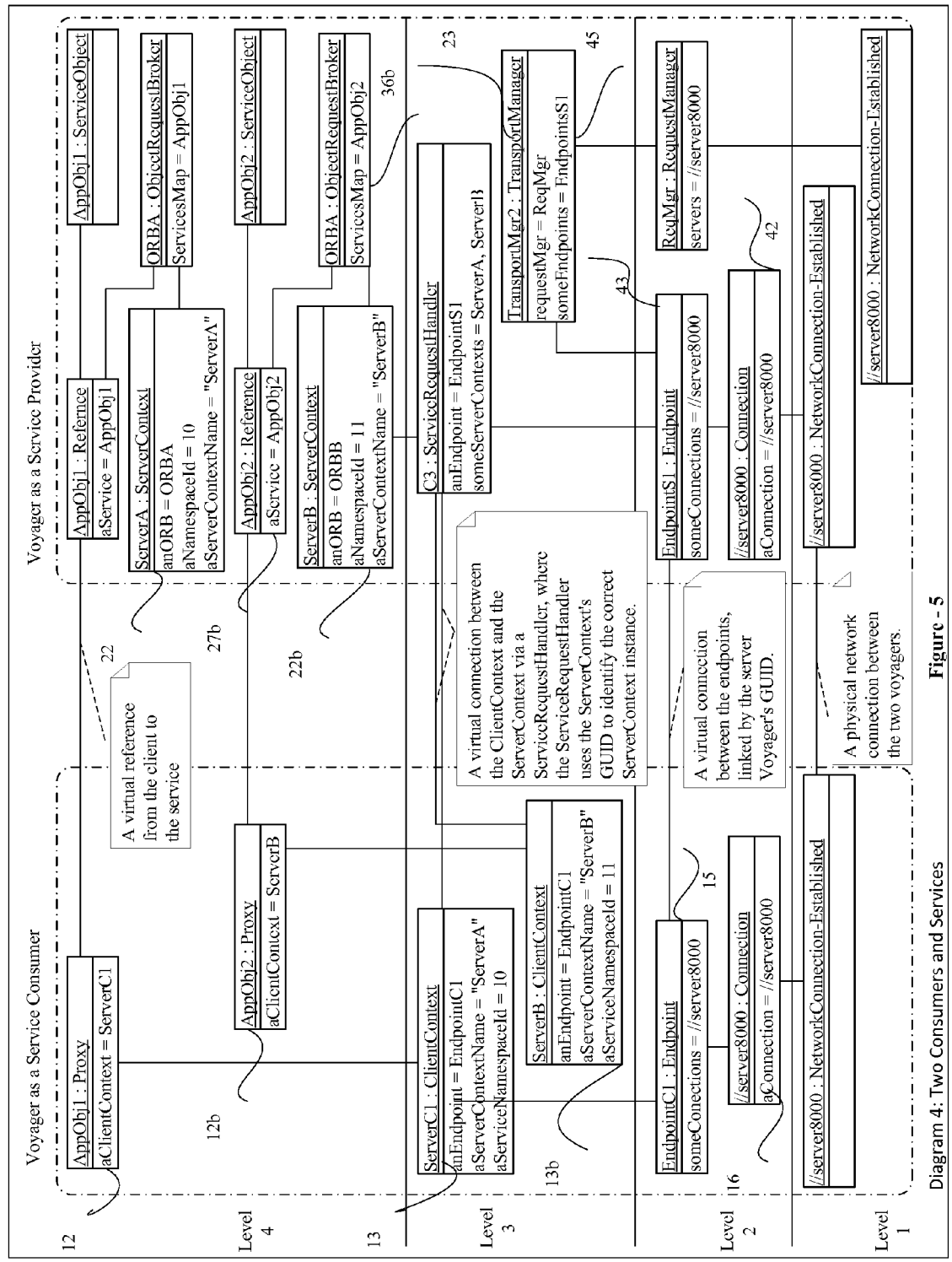
FIG. 5 shows the distributed object computing platform with multiple client contexts and multiple server contexts.

FIG. 5 is similar to FIG. 3 but shows a second ServerContext 22b with a second ORB 36b providing a second service 27b, AppObj2. In the client application 11, a second proxy 12b has been created for AppObj2 with a second ClientContext 13b. FIG. 5 illustrates that between the Service Consumer and the Service Provider there is only a single NetworkConnection-Established, with the supporting instances of NetworkConnection 16/42, and Endpoint 15/43 on respective client and server sides of the connection. That is, two proxies on the client side are able to share an endpoint.

On the server side, a single ServiceRequestHandler is shared by both ServerContexts 22, 22b. The ServiceRequestHandler 23 references both ServerContexts in field 45. When a service request is received by the ServiceRequestHandler 23 (step 111) in the process 100 of FIG. 4, the ServiceRequestHandler 23 resolves the correct ServiceContext of the ServiceRequest so that the ServiceRequest is forwarded appropriately to the correct ServerContext.

This sharing is made possible by the use of a unique namespace ID added to a service request that uniquely identifies a server context within a server application, so that service requests to the server application 21 can be uniquely resolved.

The methods described above improve application performance by reusing and sharing resources whose creation costs are high.

In order to provide a unique ID when a server application includes multiple server contexts, the ServerContext ID may be independent of any network address of the server application 21. In addition to the efficiency advantages of sharing a connection, the use of the unique identifier for a ServerContext also facilitates migration of a server context and associated ORB and services to other host devices in a manner that is transparent to the client application, as described in the Applicant's co-pending patent application Ser. No. 13/078, 948, titled "System and method for service mobility" the entire contents of which are herein incorporated by reference.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for providing services from a service provider to a service consumer, the method comprising:
   configuring a plurality of server contexts at a device, each server context comprising:
   a unique server context identity; and
   one or more indexed services;
   wherein each server context is configured to provide an indexed service in response to a service request;
   configuring a service request handler to handle service requests for the plurality of server contexts;
   receiving a service request into the service request handler from the service consumer;
   resolving a server context identity of the service request in the service request handler; and
   forwarding the service request to the resolved server context;
   retrieving an indexed service in the server context; and
   generating a service response in the server context, the service response comprising the result of an invocation of the retrieved indexed service.

2. The method of claim 1 comprising:
   creating a connection between the service request handler and the service consumer; and
   receiving a plurality of service requests for a plurality of the server contexts on the connection.

3. The method of claim 2 comprising:
   configuring a proxy in the service consumer as a proxy to an indexed service of one of the plurality of server contexts; and
   configuring a client context for the proxy that references the server context identity of the respective server context.

4. The method of claim 3 comprising:
   generating a service request in the proxy;
   providing the server context identity from the client context into the service request;
   sending the service request from the service consumer to the service provider on the connection.

5. The method of claim 1 comprising generating a server context identity that is independent of a network address of the service provider.

6. A method for sharing a connection from a client application on a client device to a server application on a server device comprising a plurality of server contexts, the method comprising:
   configuring an endpoint in the client application comprising a connection to the server application;
   configuring a plurality of client contexts in the client application, each client context comprising a reference to one of the plurality of server contexts;
   generating a plurality of service requests from the plurality of client contexts, each service request comprising:
   a service request ID;
   a namespace ID that identifies one of the plurality of server contexts; and
   a service index that identifies a service within the identified server context; and
   providing the plurality of service requests from the client application to the service application on the connection.

7. The method of claim 6 wherein configuring a client context comprises configuring an identity of the client context as a namespace ID of a server context associated with the client context.

8. The method of claim 7 comprising configuring a single client context for each server context of the server application.

9. The method of claim 6 comprising:
receiving the service request in the server application;
passing the service request to a service request handler of the server application;
resolving the namespace ID of the service request;
forwarding the service request to a server context identified by the namespace ID.

10. The method of claim 6 comprising establishing a physical connection between the client application and the server application on a network address that identifies the server application.

11. The method of claim 10 wherein the Namespace ID of a server context is independent of the network address.

12. The method of claim 6 comprising configuring the plurality of server contexts at a server device, each server context comprising:
a unique server context identity;
a services index; and
one or more services indexed by the service index;
wherein each server context is configured to provide a service response comprising the result of an invocation of the retrieved indexed service in response to a service request.

13. The method of claim 12 comprising configuring a service request handler to handle service requests for the plurality of server contexts.

14. The method of claim 13 comprising configuring a single server connection between the service request handler and the endpoint of the client application.

15. A system comprising:
at least one server device executing a server application configured to create a plurality of server contexts at a network address of the server device, each server context comprising:
a server context identity independent of the network address; and
one or more referenced services;
at least one client device executing a client application configured to:
create a plurality of client contexts as proxies for the one or more referenced services of a respective server context;
generate a service request for the one or more referenced services, the service request comprising a server context identity;
wherein at least one of the client application and the server application is configured to create a network connection between the client application and the server application such that a plurality of service requests to a plurality of the server contexts are able to be provided over the same connection.

16. The system of claim 15 wherein the server application is configured to create a service request handler that references the plurality of server contexts.

17. The system of claim 16 wherein the service request handler is configured to:
receive a service request on the connection;
resolve a server context identity from the service request; and
forward the service request to the server context identified by the server context identity in the service request.

18. The system of claim 16 wherein the service request handler is configured to resolve service requests for each of the plurality of server contexts.

19. The system of claim 15 wherein each client context stores a server context identity of the respective server context.

20. The system of claim 15 wherein each server context comprises on object request broker that references the services available for the respective server context.

* * * * *